United States Patent
Van Sinoy et al.

(10) Patent No.: US 7,514,504 B2
(45) Date of Patent: Apr. 7, 2009

(54) POLYETHYLENE BLENDS WITH GOOD CONTACT TRANSPARENCY

(75) Inventors: Alain Van Sinoy, Chastre (BE); Christian Koulic, Berloz (BE)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/816,462

(22) Filed: Apr. 1, 2004

(65) Prior Publication Data

US 2005/0222338 A1    Oct. 6, 2005

(51) Int. Cl.
C08L 23/00 (2006.01)
C08L 23/04 (2006.01)
(52) U.S. Cl. .................... 525/191; 525/240
(58) Field of Classification Search .......... 525/240, 525/245, 191; 526/116
See application file for complete search history.

(56) References Cited

U.S. PATENT DOCUMENTS 6,355,741 B1 *   3/2002   Marechal ............... 526/64
6,566,450 B2 *   5/2003   Debras et al. .......... 525/191

FOREIGN PATENT DOCUMENTS

EP    0619325    10/1994

\* cited by examiner

*Primary Examiner*—Randy Gulakowski
*Assistant Examiner*—Olga Asinovsky
(74) *Attorney, Agent, or Firm*—Tenlev R. Krueger

(57) ABSTRACT

This invention discloses the production and use of a polyethylene composition comprising a metallocene-produced linear low density polyethylene and a multi modal high density polyethylene prepared from either a Ziegler-Natta or a metallocene catalyst system. The resulting polyethylene composition is suitable for preparing articles having improved environmental stress crack resistance, rigidity, contact transparency, gloss as well as good processing capabilities.

13 Claims, 4 Drawing Sheets

POLYETHYLENE BLENDS WITH GOOD CONTACT TRANSPARENCY

FIELD OF THE INVENTION

This invention relates to the production of polyethylene blends having good optical and mechanical properties suitable for use in blow molding applications.

BACKGROUND OF THE INVENTION

For many applications, polyethylene with enhanced toughness, strength and environmental stress cracking resistance (ESCR) is important. These enhanced properties are more readily attainable with high molecular weight polyethylene. However, as the molecular weight of the polymer increases, the processability of the resin decreases. By providing a polymer with a broad or bimodal molecular weight distribution, the desired properties that are characteristic of high molecular weight resin are retained while processability, particularly extrudibility, is improved.

There are several methods for the production of bimodal or broad molecular weight distribution resins: melt blending, reactor in series configuration, or single reactor with dual site catalysts. Use of a dual site catalyst for the production of a bimodal resin in a single reactor is also known.

Chromium catalysts for use in polyolefin production tend to broaden the molecular weight distribution and can in some cases produce bimodal molecular weight distribution, but usually the low molecular part of these resins contains a substantial amount of the co-monomer. While a broadened molecular weight distribution provides acceptable processing properties, a bimodal molecular weight distribution can provide excellent properties. In some cases, it is even possible to regulate the amount of high and low molecular weight fraction and thereby regulate the mechanical properties.

Ziegler-Natta catalysts are known to be capable of producing bimodal polyethylene using two reactors in series. Typically, in a first reactor, a low molecular weight homopolymer is formed by reaction between hydrogen and ethylene in the presence of the Ziegler-Natta catalyst. It is essential that excess hydrogen be used in this process and, as a result, it is necessary to remove all the hydrogen from the first reactor before the products are passed to the second reactor. In the second reactor, a copolymer of ethylene and hexene is made so as to produce a high molecular weight polyethylene. The reverse configuration can also be used.

Metallocene catalysts are also known in the production of polyolefins. For example, EP-A-0619325 describes a process for preparing polyolefins such as polyethylene having a multimodal or at least bimodal molecular weight distribution. In this process, a catalyst system that includes at least two metallocenes is employed. The metallocenes used are, for example, a bis (cyclopentadienyl) zirconium dichloride and an ethylene bis (indenyl) zirconium dichloride. By using the two different metallocene catalysts in the same reactor, a molecular weight distribution that is at least bimodal can be obtained. Alternatively, a single metallocene catalyst component can be used in two serially connected loop reactors operated under different polymerization conditions. For example, the low molecular weight fraction is prepared in the first loop reactor in the presence of hydrogen and the high molecular weight fraction is prepared in the second loop reactor in the presence of a co-monomer, or vice versa.

Several resins or resin blends have been used in blow molding applications, but none of them provide an excellent compromise of contact transparency, gloss, impact resistance, good processing, environmental stress crack resistance (ESCR) and rigidity. For example, most high density polyethylene (HDPE) lacks contact clarity and gloss. Metallocene-prepared high density polyethylene (mHDPE) having densities larger than 0.940 g/cm$^3$ lack ESCR, whereas metallocene-prepared medium density polyethylene (mMDPE) having densities ranging from 0.930 to 0.940 g/cm$^3$ lack rigidity.

It is also known that co-extrusion is detrimental to transparency, that resins like PET cannot provide a broad range of container shapes and that clarified polypropylene has low impact resistance and poor processing capabilities.

There is thus a need to provide resins having an improved compromise between optical and mechanical properties as well as good processing capabilities.

SUMMARY OF THE INVENTION

It is an aim of the present invention to provide a polyethylene composition having good contact transparency and gloss. It is another aim of the present invention to provide a polyethylene blend having high environmental stress crack resistance and rigidity. It is also an aim of the present invention to provide a polyethylene blend having good processing capabilities. It is yet another aim of the present invention to provide a polyethylene blend having an excellent compromise between optical properties of gloss and contact transparency and mechanical properties of ESCR and rigidity.

The present invention provides a process for preparing polyethylene compositions having a multimodal molecular weight distribution that comprises the steps of: (i) providing from 10 to 90 wt. % of a metallocene-produced linear low density polyethylene (mLLDPE) resin having a density of from 0.920 to 0.940 g/cm$^3$ and a melt index MI2 of from 0.1 to 10 dg/min; (ii) providing from 90 to 10 wt. % of a bi- or multi-modal polyethylene resin prepared either with a Ziegler-Natta or with a metallocene catalyst system, said polyethylene having a density ranging from 0.940 to 0.970 g/cm$^3$ and a melt index MI2 of from 0.05 to 10 dg/min; and (iii) physically blending together the first and second polyethylenes to form a polyethylene resin having a multimodal molecular weight distribution, a density ranging from 0.935 to 0.960 g/cm$^3$ and a MI2 of 0.2 to 0.9 dg/min.

In this specification, the melt indices MI2 and HLMI (High Load Melt Index) are measured by the procedures of ASTM D 1238 using a load respectively of 2.16 and 21.6 kg at a temperature of 190° C., and the density is measured at 23° C. by the procedures of standard test ASTM D 1505.

Preferably, the blend comprises from 25 to 75 wt. % of the first metallocene-prepared polyethylene resin and from 25 to 75 wt. % of the multimodal polyethylene resin. More preferably the blend comprises about 50 wt % of each resin.

The first polyethylene resin is monomodal and is produced with a metallocene catalyst system. The second polyethylene resin has a multimodal molecular weight distribution and may be produced using either a Ziegler-Natta catalyst system or a metallocene-based catalyst system. It may be produced using two or more of those different catalyst systems in a single reactor or alternatively, it may be produced with a single catalyst system in two or more serially connected loop reactors operated under different polymerization conditions. The final polyethylene resin has a broad or multimodal molecular weight distribution and is produced by physically blending the first and second polyethylene resins.

In another embodiment according to the present invention, the final multimodal polyethylene resin can be prepared as a chemical blend using a metallocene catalyst system in two or more serially connected reactors operated under different polymerization conditions.

The use of a metallocene catalyst component enables the preparation of a linear low-density polyethylene fraction having a very narrow molecular weight distribution. This yields both improved slow and rapid crack propagation properties as a result of a high and uniform level of co-monomer distribution in the low density fraction. The density is preferably not more than 0.940 g/cm$^3$, and more preferably of at most 0.935 g/cm$^3$: this is somewhat lower than the low density fractions achievable by Ziegler-Natta or chromium based catalysts, particularly when used in a slurry loop process. Thus, the use of this metallocene catalyst enables precise control of the molecular weight distribution and density of the high molecular weight fraction of the resin, yielding improved mechanical properties. The melt index MI2 is preferably of from 0.5 to 5 dg/min. It is preferred that the melt index of the metallocene-prepared polyethylene component is larger than that of the bimodal polyethylene component in order to obtain good optical properties.

The molecular weight distribution is defined by the polydispersity index D that is equal to the ratio Mw/Mn of the weight average molecular weight Mw over the number average molecular weight Mn.

The second polyethylene resin has a bi- or multi-modal molecular weight distribution and is produced by ethylene homo and/or copolymerization in the presence of a Ziegler-Natta catalyst system and/or a metallocene-based catalyst system. Preferably it is a Ziegler-Natta-based polyethylene resin having a bimodal molecular weight distribution.

Preferably, the density of the final resin is of from 0.940 to 0.950 g/cm$^3$ and more preferably of about 0.945 g/cm$^3$. Preferably, the melt index MI2 is of from 0.4 to 0.7 dg/min and more preferably of about 0.5 dg/min. The resins consist not only of the high molecular weight fraction, but also a low molecular weight fraction whereby the resins as a whole have a broad or multimodal molecular weight distribution. The provision of such a multimodal distribution yields a combination of improved mechanical properties of the resin, without compromising the processability. In addition, the optical properties of gloss and contact transparency are excellent.

The first and second polyethylene resins constitute separately produced resins, which are then physically blended to form the composite polyethylene resin having a multimodal molecular weight distribution. The production of the polyethylene comprising the lower molecular weight fraction of the composite resin can be controlled to give the desired processing properties for the resin. It has been shown that the combination of low branching (ideally, no branching) in the low molecular part of the resin and high co-monomer incorporation in the high molecular part significantly improves the resin properties with respect to resistance to slow crack growth and impact strength.

The metallocene catalyst component used in the present invention is preferably a bis (tetrahydroindenyl) metallocene component of general formula (I):

R"(THI)$_2$MQ$_2$       (I)

wherein THI is a tetrahydroindenyl that may be substituted in the same way or differently from one another at one or more positions in the cyclopentadienyl ring, the cyclohexenyl ring and the ethylene bridge, R" is a bridge imparting stereorigidity between the two cyclopentadienyl rings, M is a metal group 4 of the Periodic Table (Handbook of Chemistry, 76$^{th}$ edition) and each Q is the same or different and may be a hydrocarbyl or hydrocarboxy radical having 1-20 carbon atoms or a halogen.

Each substituent group on the tetrahydroindenyl may be independently chosen from those of formula XR$_v$, in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or CH3. More preferably, at least one and most preferably both cyclopentadienyl rings are unsubstituted. In a particularly preferred embodiment, both indenyls are unsubstituted. Preferably, the bridge R" that is a methylene or ethylene bridge either substituted or unsubstituted. The metal M is preferably zirconium, hafnium or titanium, most preferably zirconium. Suitable hydrocarbyls for Q include aryl, alkyl, alkenyl, alkylaryl or aryl alkyl. Each Q is preferably a halogen. Ethylene bis(4,5,6,7-tetrahydro-1-indenyl)zirconium dichloride is a particularly preferred bis tetrahydroindenyl compound of the present invention.

Another suitable metallocene catalyst component that can be used in the present invention is a bis-cyclopentadienyl of formula (II):

bis(n-butyl-Cp)MQ$_2$       (II)

wherein M and Q are as defined above. The preferred metallocene component is a tetrahydroindenyl.

The metallocene catalyst component used in the present invention can be prepared by any known method. A preferred preparation method for preparing the tetrahydroindenyl component is described in J. Org. Chem. 288, 63-67 (1985).

The activating agent used to activate the metallocene catalyst component can be any activating agent having an ionizing action known for this purpose such as aluminum-containing or boron-containing compounds. The aluminum-containing compounds comprise alumoxane, alkyl aluminum and/or Lewis acid.

The alumoxanes are well known and preferably comprise oligomeric linear and/or cyclic alkyl alumoxanes represented by formula (III):

R—(Al—O)$_n$—AlR2
    |
    R     (III)

for oligomeric, linear alumoxanes and

(—Al—O—)$_m$
   |
   R     (IV)

for oligomeric, cyclic alumoxane, wherein n is 1-40, preferably 10-20, m is 3-40, preferably 3-20 and R is a C$_1$-C$_8$ alkyl group and preferably methyl.

Suitable boron-containing co-catalysts may comprise a triphenylcarbenium boronate such as tetrakis-pentafluorophenyl-borato-triphenylcarbenium as described in EP-A-0427696, or those of the general formula [L'-H]+[B Ar$_1$ Ar$_2$ X$_3$ X$_4$]- as described in EP-A-0277004 (page 6, line 30 to page 7, line 7).

The metallocene catalyst system may be employed in a solution polymerization process, which is homogeneous, or a slurry process, which is heterogeneous. In a solution process, typical solvents include hydrocarbons with 4 to 7 carbon atoms such as heptane, toluene or cyclohexane. In a slurry process, it is necessary to immobilize the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group IIA, IIIA, IVA or IVB metal oxides such as silica, alumina and mixtures thereof. Other inorganic oxides that may be employed either alone or in combination with the silica or alumina are magnesia, titania, zirconia, and the like. Other suitable support materials, can be employed, for example, as finely divided functionalized polyolefins such as finely divided polyethylene. Preferably, the support is silica having a surface area comprised between 200 and 900 m$^2$/g and a pore volume comprised between 0.5 and 4 cm$^3$/g.

The amounts of activating agent and metallocene usefully employed in the preparation of the active catalyst system can vary over a wide range. Preferably the mole ratio of aluminum or boron to transition metal is in the range between 1:1 and 100:1, preferably in the range 5:1 and 50:1.

Where the polymerization reaction is performed in slurry, a reaction temperature is in the range 70° C. to 110° C. may be used. Where the reaction is performed in solution, by selection of a suitable solvent a reaction temperature in the range 150° C. to 300° C. may be used. The reaction may also be performed in the gas phase using a suitably supported catalyst. The amount of hydrogen introduced in the reactor depends upon the desired final melt index of the resin and upon the nature of the metallocene catalyst component.

The MI2 of the low density polyethylene resin made in accordance with the present invention typically falls in the range 0.1 to 20 dg/min, preferably in the range 0.5 to 5 dg/min. The density is typically in the range 0.920 to 0.940 g/ml. The polydispersity D is in the range 2 to 4.5, preferably around 3 and more preferably, the resin partially has long chain branches to facilitate processing.

The Ziegler-Natta catalyst preferably consists of a transition metal component (compound A) which is the reaction product of an organo-magnesium compound with a titanium compound and an organo-aluminum component (compound B).

For preparing compound A, suitable titanium compounds can be selected from tetravalent halogenated titanium compounds, preferably titanium compounds of the general formula TiX$_n$(OR)$_{4-n}$ in which n is 1 to 4, X stands for chlorine or bromine, and R for identical or different hydrocarbon radicals, especially straight-chain or branched alkyl groups having 1 to 18, preferably 1 to 10, carbon atoms; suitable organo-magnesium compounds can be selected from magnesium alcoholates, preferably those of the general formula Mg(OR)$_2$, in which R stands for identical or different hydrocarbon radicals, preferably straight-chain or branched alkyl groups having 1 to 10 carbon atoms; magnesium alcoholates having alkyl groups from 1 to 4 carbon atoms are preferred. The preferred titanium compound is TiCl$_4$.

This reaction is advantageously carried out at temperatures of from 0 to 200° C., the upper temperature limit being determined by the decomposition temperature of the tetravalent halogenated titanium compound used; it is advantageously carried out at temperatures of from 60 to 120° C.

Subsequently, the reaction product of magnesium alcoholate and tetravalent halogenated titanium compound which is insoluble in hydrocarbons is freed from unreacted titanium compound by washing it several times with one of the above inert diluents in which the titanium-(IV)-compound used is readily soluble.

The titanium contents of compound A may be within the range of from 0.05 to 10 mg.-atom, per gram of compound A. It can be controlled by the reaction time, the reaction temperature and the concentration of the tetravalent halogenated titanium compound used.

The concentration of the titanium component fixed on the magnesium compound is advantageously in the range of from 0.005 to 1.5 mmol, preferably from 0.03 to 0.8 mmol, per liter of dispersing agent or reactor volume. Generally, even higher concentrations are possible.

The organo-aluminum compound B may be reaction products of aluminum-trialkyl or aluminum-dialkyl hydrides with hydrocarbon radicals having 1 to 16 carbon atoms. Other suitable organo-aluminum compounds can be selected from chlorinated organo-aluminum compounds, for example dialkyl-aluminum monochlorides of the formula R$_2$AlCl or alkyl-aluminum sesquichlorides of the formula R$_3$Al$_2$Cl$_3$, in which formulae R stands for identical or different hydrocarbon radicals, preferably alkyl groups having 1 to 16 carbon atoms.

The organoaluminum may be used in a concentration of from 0.5 to 10 mmol per liter of reactor volume.

Optionally, a cocatalyst such as a triethylaluminum (TEAL) is employed in the reactor.

The polymerization reaction is preferably carried out in two or more serially connected reactors operated under different conditions in order to prepare resins having a bi- or multi-modal molecular weight distribution.

A metallocene catalyst system may also be used in two or more reactors to prepare the high density resin having a multimodal molecular weight distribution.

According to one embodiment according to the present invention, the polyethylene resins are each produced individually in a separate reactor, preferably a loop reactor and they are physically blended with one another for example by extrusion or melt blending.

The final resin has an excellent environmental stress crack resistance (ESCR), a very high stiffness and impact resistance and a very good contact transparency and gloss. It also has good processing capabilities. More importantly it has an excellent compromise between all these properties.

In addition, the first low density polyethylene component used in the blend according to the present invention has a fairly large melt index, and thus not a very high molecular weight. This allows the very high speed production of bottles having good contact transparency. Up to 10,000 bottles/hour can be produced with the polyethylene blend according to the present invention.

The polyethylene used in blow molding, injection molding and injection blow molding applications as well as in the extrusion of tubes.

Preferably, it is used for preparing articles having a capacity of from 1 mL to 10 liters, preferably from 50 mL to 3 liters.

Because of its good optical properties the resin is suitable for cosmetic or household packaging.

Figure 2:
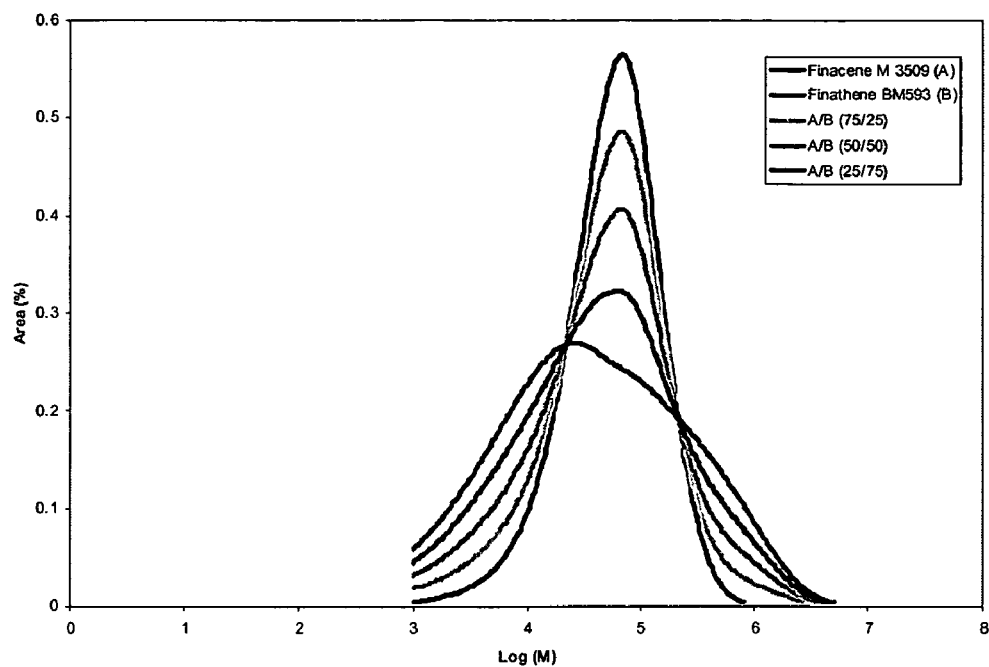

FIG. 2 represents the molecular weight distributions, determined by gel permeation chromatography, of the starting metallocene and bimodal Ziegler-Natta polyethylene resins and of blends containing respectively 25, 50 and 75 wt % of the bimodal resin.

Figure 3:
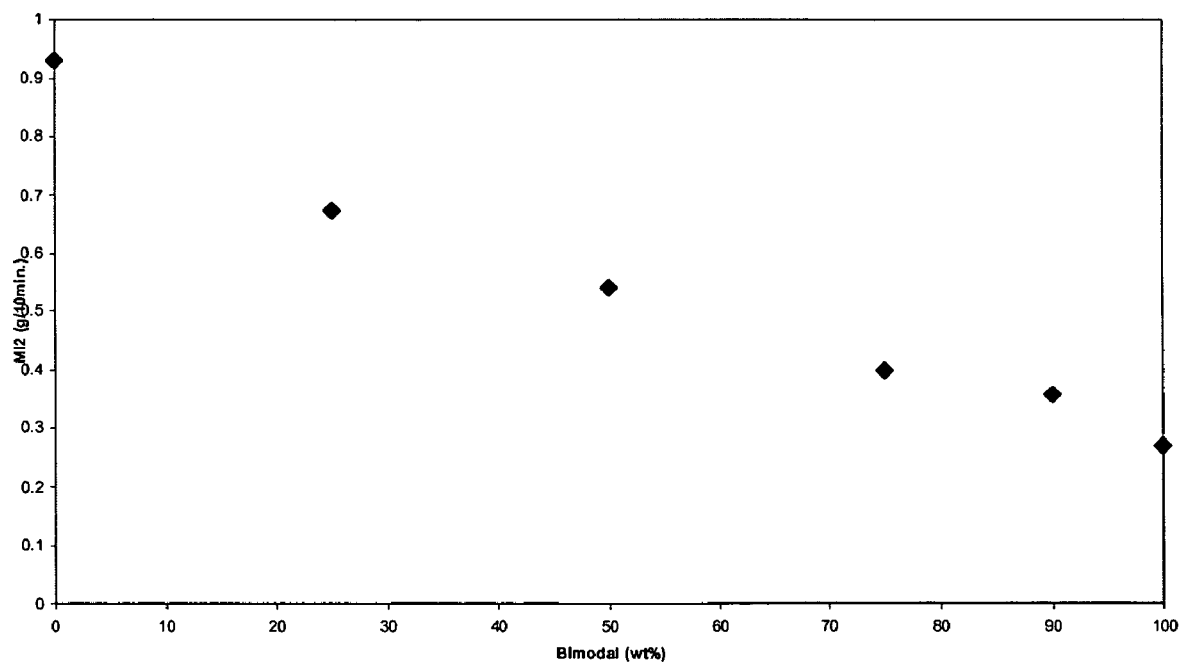

FIG. 3 represents the melt flow index MI2 expressed in dg/min as a function of the percentage of bimodal polyethylene resin expressed in %.

Figure 4:
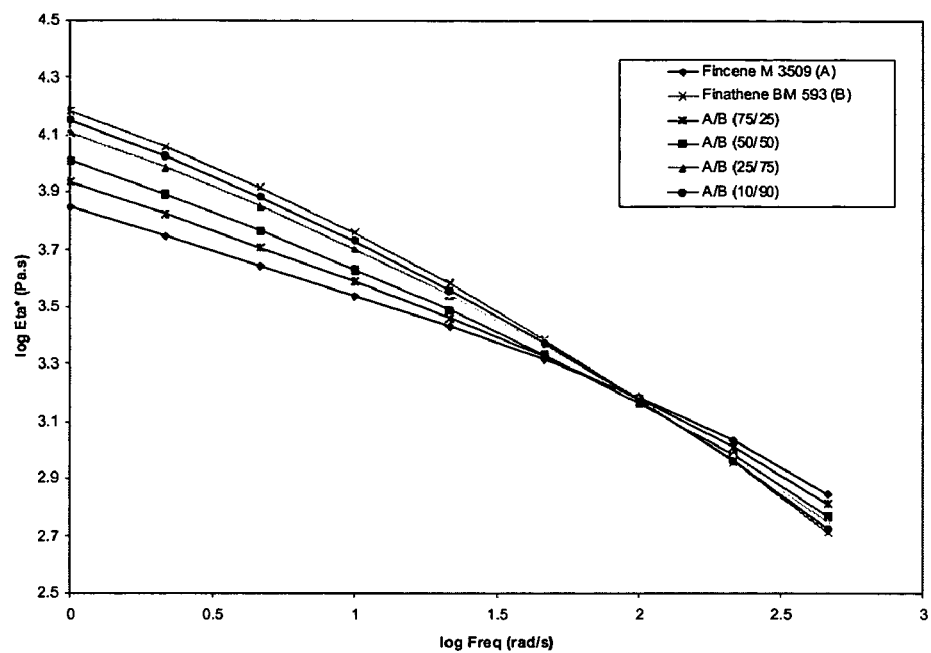

FIG. 4 represents a log-log graph of the viscosity expressed in Pa·s as a function of frequency expressed in rad/s.

Figure 5:
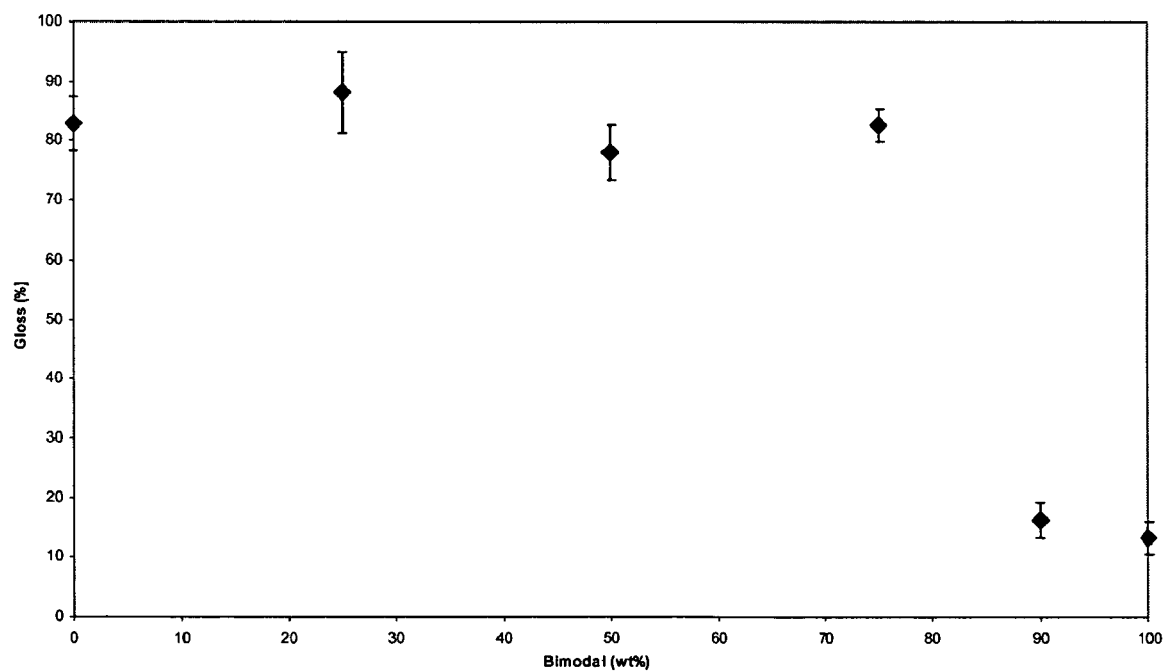

FIG. 5 represents a graph of the gloss expressed in % as a function of the amount of the bimodal polyethylene resin expressed in %.

Figure 6:
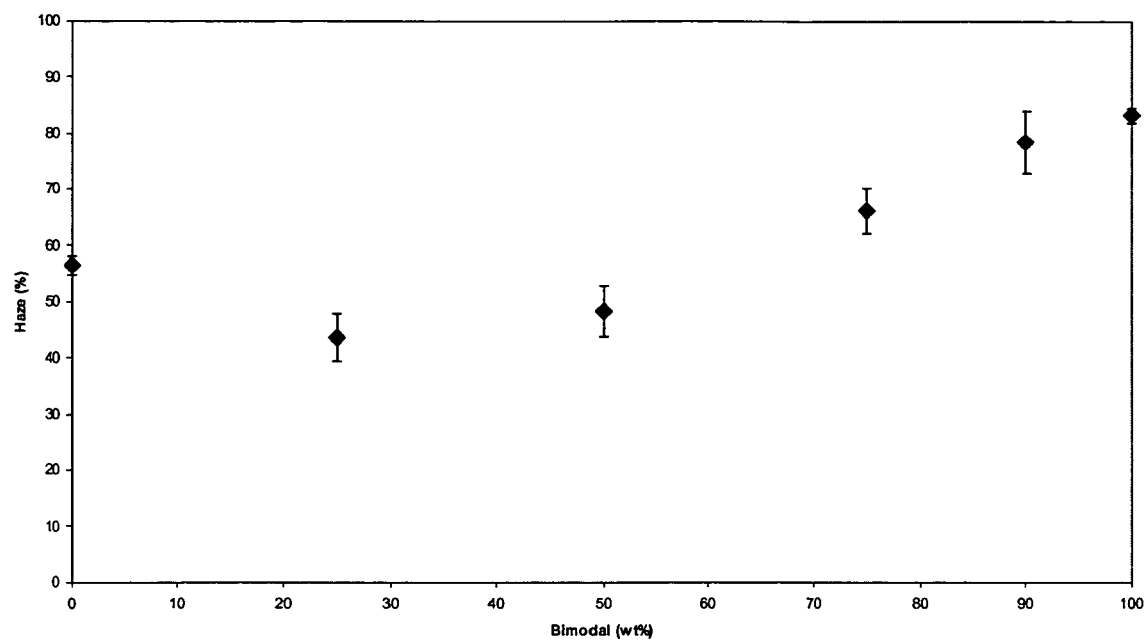

FIG. 6 represents a graph of the haze expressed in % as a function of the amount of the bimodal polyethylene resin expressed in %.

Figure 7:
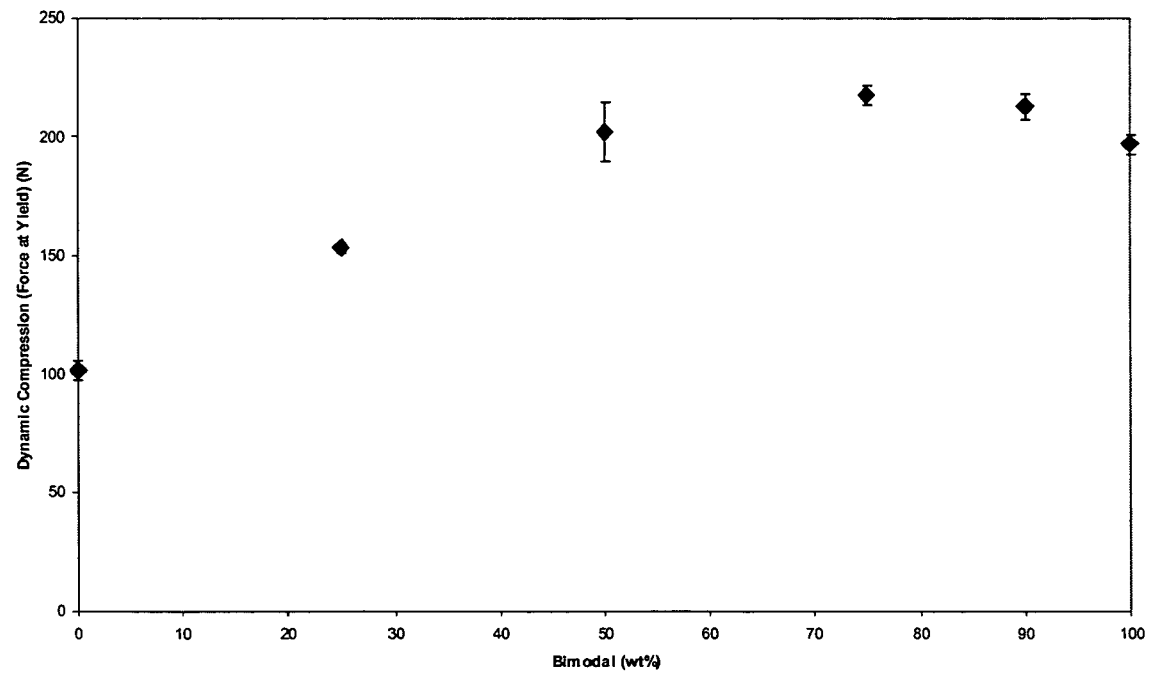

FIG. 7 represents a graph of the dynamic compression expressed in newtons as a function of the amount of the bimodal polyethylene resin expressed in %.

DETAILED DESCRIPTION OF THE INVENTION

EXAMPLES

Several polyethylene blends have been prepared from a metallocene resin R1 sold by ATOFINA Research under the name Finacene® M3509 and a bimodal Ziegler-Natta resin R2 sold by ATOFINA Research under the name Finathene® BM593.

The properties of the starting resins are summarized in Table I.

TABLE I

| Resin | R1 | R2 |
|---|---|---|
| Density (g/cm$^3$) | 0.9345 | 0.9579 |
| MI2 (dg/min) | 0.93 | — |
| HLMI (dg/min) | 28.5 | 27.7 |
| Mn (Da) | 32133 | 12329 |
| Mw (Da) | 81318 | 166544 |
| D | 2.5 | 13.5 |

The blends were prepared by melt blending, using respectively 10, 25, 50, 75 and 90 wt % of the bimodal Ziegler-Natta resin R2, the remainder being the metallocene-prepared polyethylene resin R1, and they were pelletized on a Thoret extruder.

Bottles were then prepared on a Krupp Kautex KEB 5-430 blow molding machine from dry-blended pellets. The bottles' characteristics were as follows: weight=20 g, capacity=430 mL and wall thickness=0.5 to 0.7 mm.

The blow molding conditions were as follows: screw diam=40 mm, tool=13/12 mm, screw comprising 11 zones, with temperature varying from 180° C. in zone 1 to 190° C. in zone 3 and remaining at 190° C. from zone 3 to zone 11: screw head temperature=190° C., mass temperature=180° C., pressure=232 bars, extruder speed=40 rpm, throughput=10 kg/h and couple=30 amp. The bottles were then tested for contact transparency, gloss, haze, ESCR and dynamic compression. Gloss was measured following the method of standard test ASTM D 2457-90. Haze was measured following the method of standard test ASTM D1003-2000. ESCR was measured following the method of standard test ASTM D-1693-70 condition B with 100% antarox (ESCR100). Dynamic compression was measured following the method of standard test ASTM D 2659-95.

Figure 1:
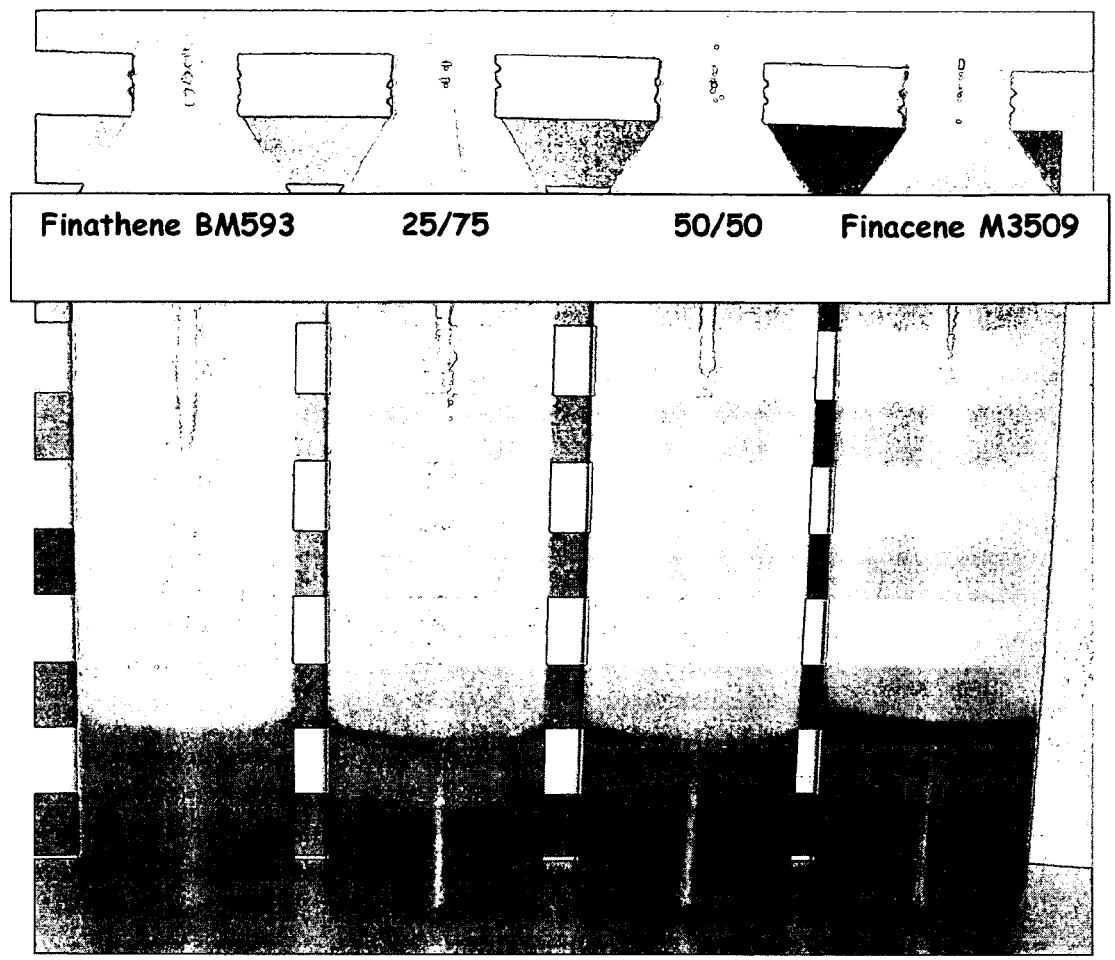
FIG. 1 represents four bottles prepared respectively with a pure bimodal Ziegler-Natta polyethylene resin Finathene BM593 (R2), with a blend comprising 25 wt % of resin R2 and 75 wt % of a metallocene-prepared polyethylene resin Finacene M3509 (R1), with a blend of 50 wt % of R2 and 50 wt % of R1, and with a pure resin R1

Contact transparency can be seen on FIG. 1 which clearly shows that the contact transparency of the bottle prepared with the bimodal resin resin R2 is very poor and that the good contact transparency of the bottle prepared with the metallocene resin R1 is not altered by the addition of bimodal resin R2.

The molecular weight distributions of the starting resins and of several final resins, as determined by gel permeation chromatography (GPC), are represented in FIG. 2.

The melt flow index MI2 of the final resin as a function of percentage of the bimodal polyethylene component is represented in FIG. 3. It shows a gradual decrease of melt index with increasing amount of the bimodal resin.

The viscosities of the starting resins and of several blends are represented in FIG. 4: it shows a progressive increase in viscosity with increasing amount of bimodal resin at low frequencies.

The gloss results are represented in FIG. 5. It can be seen very clearly that the excellent gloss properties, generally associated with metallocene-prepared polyethylene resins, remain excellent for amounts of added bimodal polyethylene resin of up to 80 wt %.

More interestingly, the haze values, known to be excellent for metallocene-prepared polyethylene resins, show a marked improvement for amounts of added bimodal polyethylene of up to 50 wt % and remain equivalent to those of metallocene-prepared resins for amounts of added bimodal polyethylene resin of up to 80 wt %. This can be seen in FIG. 6.

The dynamic compression increases with increasing amounts of bimodal polyethylene resin, up to amounts of bimodal resin of 90 wt % as can be seen in FIG. 7.

Chromium-based resin Lacqtene® 2002 TH40 commercialised by ATOFINA (resin R3) has been used for comparison. It has a density of 0.940 g/cm$^3$, that is equivalent to that of a blend comprising 25 wt % of resin R1 and 75 wt % of resin R2. The gloss value of the chromium-based resin is of about 10% and its haze value is of about 75% as compared with values for the blend respectively of about 90% and about 45%.

A resin blend comprising 50 wt % of resin R1 and 50 wt % of resin R2 and having a density of 0.947 g/cm$^3$ was compared for gloss, haze and ESCR with a metallocene-prepared polyethylene resin sold by ATOFINA Research under the name Finacene® ER2263 (resin R4) having the same density of 0.947 g/cm$^3$.

The results are displayed in Table II.

TABLE II

| Resin | R4 | 50 wt % R1 + 50 wt % R2 |
|---|---|---|
| ESCR100 (h) | 20 | >1000 |
| gloss (%) | 60 | 80 |
| haze (%) | 65 | 48 |

It can thus be seen that a resin that is normally known to have excellent ESCR and gloss properties loses its good performances for densities larger than 0.940 g/cm$^3$ typical of the densities of the blends according to the present invention.

The blends of the present invention thus offer the most advantageous compromise of gloss, contact transparency, ESCR, strength and processability.

The invention claimed is:

1. A process for preparing a polyethylene resin composition having a multimodal molecular weight distribution that comprises the steps of:
   (a) providing from 10 to 90 weight percent of a first metallocene-produced linear low density polyethylene (mLLDPE) resin having a density of from 0.920 to 0.940 g/cm$^3$ and a melt index MI2 of from 0.1 to 10 dg/min;
   (b) providing from 90 to 10 weight percent of a second bi- or multi-modal polyethylene resin prepared either with a Ziegler-Natta or with a metallocene catalyst system, said polyethylene having a density ranging from 0.940 to 0.970 g/cm$^3$ and a melt index MI2 of from 0.05 to 10 dg/min;
   (c) physically blending together the first and second polyethylenes to form a polyethylene resin having a multimodal molecular weight distribution, a density ranging from 0.935 to 0.960 g/cm$^3$ and a MI2 of from 0.2 to 0.9 dg/min.

2. The process according to claim 1 wherein the first mLLDPE has a density of not more than 0.935 g/cm$^3$.

3. The process of claim 1 wherein the first mLLDPE has a melt flow index MI$_2$ of from 0.5 to 5 dg/min.

4. The process according to claim 1 wherein the second polyethylene resin has a bimodal molecular weight distribution.

5. The process according to claim 4 wherein the second polyethylene resin is produced with a Ziegler-Natta catalyst system.

6. The process according to claim 1 wherein the amount of the first mLLDPE is of from 25 to 75 weight percent and the amount of the second polyethylene resin is of from 25 to 75 weight percent.

7. The process according to claim 6 wherein the amount of each polyethylene component in the blend is of about 50 weight percent.

8. The process according to claim 1 wherein the metallocene catalyst component used to prepare the mLLDPE is ethylene bis(4,5,6,7-tetrahydro-1-indenyl) zirconium dichloride.

9. The method of claim 1 wherein the melt index MI$_2$ of said first polyethylene resin
   is greater than the melt index MI$_2$ of said second polyethylene resin.

10. The method of claim 9 wherein said blended melt polyethylene resin has a density within the range of 0.940-0.950 g/cm$^3$.

11. The process of claim 10 wherein said blended polyethylene resin has a density of about 0.945 g/cm$^3$.

12. The process of claim 1 wherein said blended polyethylene resin has a melt index MI$_2$ within the range of 0.4-0.7 dg/min.

13. The process of claim 12 wherein the melt index MI$_2$ of said blended polyethylene resin is about 0.5 dg/min.

* * * * *

UNITED STATES PATENT AND TRADEMARK OFFICE
CERTIFICATE OF CORRECTION

| | | |
|---|---|---|
| PATENT NO. | : 7,514,504 B2 | Page 1 of 1 |
| APPLICATION NO. | : 10/816462 | |
| DATED | : April 7, 2009 | |
| INVENTOR(S) | : Alain Van Sinoy and Christian Koulic | |

It is certified that error appears in the above-identified patent and that said Letters Patent is hereby corrected as shown below:

On the Title Page

Item (74) Attorney, Agent, or Firm:

"Tenlev" should read --Tenley--.

Signed and Sealed this

Ninth Day of March, 2010

David J. Kappos
*Director of the United States Patent and Trademark Office*